(12) United States Patent
Paskiewicz

(10) Patent No.: US 6,467,746 B1
(45) Date of Patent: Oct. 22, 2002

(54) VEHICLE TURNABOUT

(76) Inventor: Ronald Paskiewicz, 52 S. Buffalo St., Hamburg, NY (US) 14075

( * ) Notice: Subject to any disclaimer, the term of this patent is extended or adjusted under 35 U.S.C. 154(b) by 0 days.

(21) Appl. No.: 09/563,761

(22) Filed: May 1, 2000

Related U.S. Application Data

(63) Continuation-in-part of application No. 09/100,548, filed on Jun. 19, 1998.

(51) Int. Cl.$^7$ ............................ A47B 91/00; A47B 95/00
(52) U.S. Cl. ............................ 248/349.1; 248/346.05; 104/44; 104/45
(58) Field of Search .................. 248/349.1, 346.05, 248/131; 104/44, 36, 38, 35, 45, 46; 414/537

(56) References Cited

U.S. PATENT DOCUMENTS

| | | | | |
|---|---|---|---|---|
| 2,025,320 A | * | 12/1935 | Waalkes | 104/44 |
| 2,058,115 A | * | 10/1936 | Wheeler | 104/44 |
| 3,788,414 A | | 1/1974 | Netter | 187/8.71 |
| 3,854,404 A | | 12/1974 | Janda | 104/44 |
| 3,854,436 A | | 12/1974 | Cox | 115/0.5 A |
| 3,879,784 A | | 4/1975 | Kummerman | 14/71 |
| 4,077,607 A | | 3/1978 | Lovelady | 254/88 |
| 4,531,712 A | | 7/1985 | Christian et al. | 254/88 |
| 4,796,537 A | * | 1/1989 | Besser | 104/37 |
| 5,086,704 A | | 2/1992 | Mueller | 104/44 |
| 5,239,854 A | | 8/1993 | Hinson | 72/457 |
| 5,852,978 A | * | 12/1998 | Daschel | 104/44 |

FOREIGN PATENT DOCUMENTS

| | | | |
|---|---|---|---|
| BE | 541287 | 9/1955 | 211/17 |
| DE | 566545 | 12/1932 | 254/88 |
| FR | 994228 | 11/1951 | 254/88 |
| GB | 138580 | 2/1920 | 208/91 |
| GB | 1578417 | 11/1980 | |
| IT | 481457 | 5/1953 | 254/91 |

* cited by examiner

Primary Examiner—Leslie A. Braun
Assistant Examiner—Gwendolyn Wrenn Baxter
(74) Attorney, Agent, or Firm—Hodgson Russ LLP

(57) ABSTRACT

A support structure including a turntable, support platform, and a set of ramps. The ramps and support platform provide support for a vehicle such as a motorcycle, snowmobile, or the like. The entire apparatus swivels by means of the turntable at 360°, and the apparatus also has a set of retractable wheels which enable the apparatus to be rolled across a horizontal surface.

5 Claims, 10 Drawing Sheets

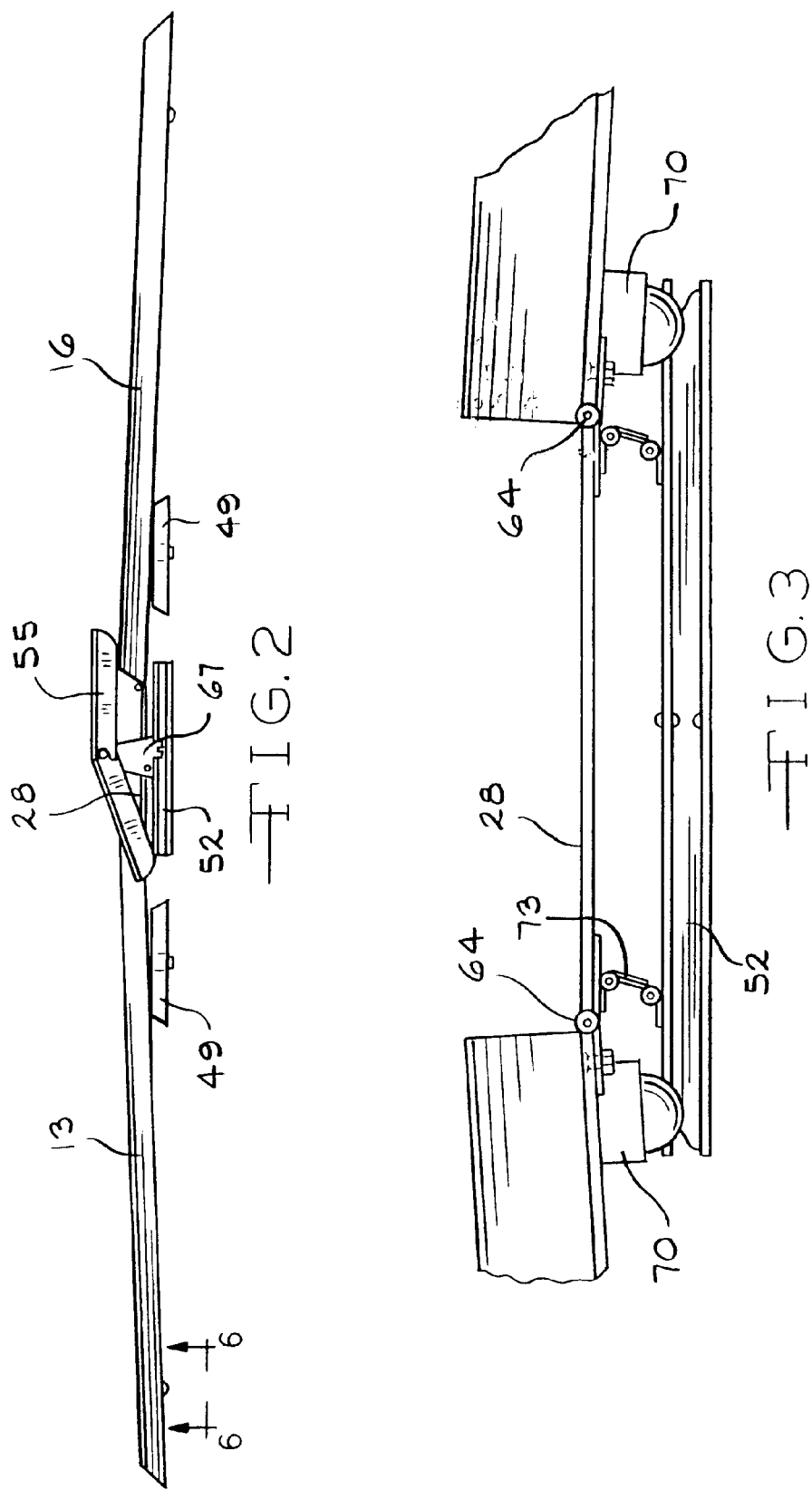

VEHICLE TURNABOUT

CROSS REFERENCE TO RELATED APPLICATION

The present application is a continuation-in-part of U.S. patent application Ser. No. 09/100,548 filed Jun. 19, 1998, and entitled "Motorcycle Turnabout", which is hereby incorporated by reference.

FIELD OF THE INVENTION

The present invention relates to a support apparatus, and more particularly to a support apparatus designed for moving and rotating two-wheeled vehicles or snowmobiles in a confined space.

BACKGROUND OF THE INVENTION

Owners of motorcycles or other larger two-wheeled vehicles often park the vehicles in garages and other storage buildings to protect them from the elements and/or to provide security from theft. Moving these vehicles in and out of confined spaces can be cumbersome. Large two-wheeled vehicles such as motorcycles often weigh twelve hundred pounds or more. Operating these vehicles at highway speeds requires minimal effort, however, when the vehicle is stopped, the full weight of the vehicle is a disadvantage to the operator. Also, the turning radius of the larger vehicles is relatively large making it difficult to maneuver in a garage or storage facility where space is limited. The same limitations apply to maneuvering snowmobiles in confined areas. Typically the space required, to turn around these vehicles easily, is approximately twice the length of the vehicle. Accordingly, individuals who own vehicles must maneuver them back and forth several times to exit confined areas. Given the size and weight of the vehicle and the slow intricate movements, the potential for hazard to person and property is significant. For example, turning too sharply, or moving backwards may cause the individual to lose balance and fall.

In addition to turning the vehicle around, there is also a need to be able to move the vehicle in other ways besides simple rotation. For long periods of inactivity it may be desirable to move the vehicle into areas that are more suitable for long term storage. With the size, weight, and lack of maneuverability of the vehicle, moving the vehicle into tight spaces can be difficult. Vehicles of this size cannot be pushed sideways and, accordingly, considerable space is usually required to maneuver the cycle into position. Therefore, it would be advantageous to be able to roll the support apparatus in all directions with a vehicle on it.

Given that space is usually limited in these storage areas there is also a need for a support apparatus that takes up a minimum of space when not in use.

Accordingly, what is needed is a support apparatus that is capable of providing ramps so that the vehicle can be loaded without lifting, providing a base for rotating the vehicle on the support structure 360°, providing a set of wheels or casters so that the entire apparatus can be moved about freely, providing a means or method of folding up the apparatus for storage, and interrelating the loading, moving, and swivelling functions such that the vehicle can be safely moved and rotated on the support structure.

SUMMARY OF THE INVENTION

The present invention meets the above-described needs by providing a support structure that comprises a turntable having a base, a support platform mechanically coupled to the turntable, a first ramp connected to the support platform, and a second ramp connected to the support platform. The support platform has a set of casters attached which are used for transporting the support structure across a horizontal support surface. The support platform is pivotally attached to the turntable by hinges such that the casters can be engaged with the support surface for transporting the support apparatus and also the casters can be retracted from the support surface to allow the base of the turntable to contact the support surface. When the wheels are retracted the base of the turntable contacts the support surface and the apparatus is capable of swivelling at 360°.

When a vehicle is being loaded onto the support apparatus, the wheels on the caster attached to the support platform have to be retracted and it is also desirable that the turntable not be allowed to rotate. In order to prevent rotation of the turntable during loading, the support apparatus is provided with a locking mechanism that engages with the turntable.

The turntable preferably rotates on a base plate that engages with the support surface. The turntable provides for swivelling the support structure around a 360° arc.

The support platform is hingedly connected to the turntable and has a set of casters attached thereto. The support platform also engages with a linkage that provides for movement of the support apparatus between the casters deployed and the casters retracted positions.

A vertical support member supports the linkage and is preferably fixedly connected to the turntable at one end. At the other end the support member supports a footplate. The footplate is pivotally attached to the support member and has a first link extending therefrom. By applying pressure to the footplate, the footplate is rotated about the support member such that the first link moves a second link that is pivotally connected to the first link. The second link is attached at one end to the first link and is attached at the opposite end to a cam link. The cam link engages a pin connected to the support platform such that the support platform moves towards the turntable which lowers the casters to a point where they engage with the support surface. Accordingly, the rotation of the footplate enables the support platform to collapse down to the turntable and enables the casters to extend beside the turntable to engage with the support surface.

A first ramp and a second ramp attach to the support platform on opposite ends. The ramps have wheels or other rolling devices positioned at the end so that when the turntable swivels the ramps also are able to move across the support surface. The ramps are connected to the support platform by hinges which enable them to be folded up to reduce their footprint for storage purposes. Attached to the bottom of the ramps are a set of lateral support members that provide support for a kickstand on a typical vehicle. The lateral support members can be made to retract into the space under the ramp for easier storage.

In an alternate embodiment, the platform attaches to a bearing plate that can be raised and lowered relative to the platform by means of a jack screw. In this manner, the platform can be raised above the support surface such that the casters engage the support surface for rolling movement of the platform. When the bearing plate is lowered below the casters into engagement with the floor the platform is capable of rotational movement.

Accordingly, it is an object of the present invention to provide a support apparatus for two-wheeled vehicles that is capable of changing between a swivelling mode and a free-wheeling mode so that the entire support apparatus and the vehicle can be swivelled or transported across a horizontal surface. It is another object to provide a support apparatus that is capable of being folded up into a smaller footprint for ease of storage.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like referenced characters designate the same or similar parts throughout the figures of which:

FIG. 2 is a side elevation of the support structure of the present invention;

FIG. 3 is a sectional view taken along line 3—3 of FIG. 1;

DESCRIPTION OF THE PREFERRED EMBODIMENTS

Figure 1:
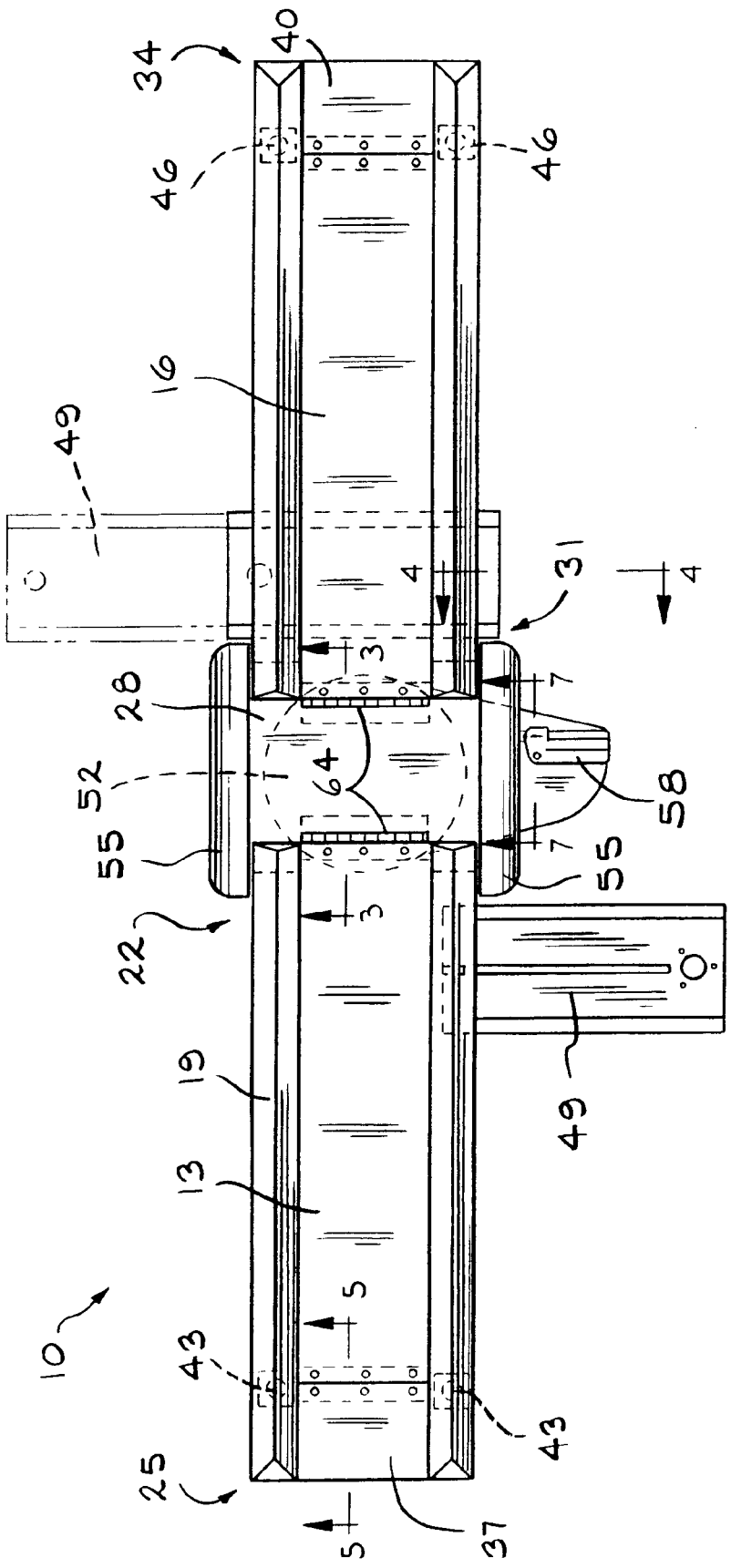
FIG. 1 is a top plan view of the support apparatus of the present invention.

In FIG. 1 a support apparatus 10 comprises a first ramp 13 and a second ramp 16. The apparatus 10 is preferably formed out of a rigid, durable material such as steel. However, it will be apparent to those of ordinary skill in the art that other materials may be substituted for some or all of the component parts of the apparatus 10 depending on the size, weight, load requirements, and cost. Ramps 13 and 16 may be equipped with side rails 19 which provide guidance for the wheels of the vehicle (not shown) when it is being driven onto the support apparatus 10. The first ramp 13 has a proximal end 22 and a distal end 25. The proximal end 22 is positioned near the support platform 28. Support platform 28 is preferably constructed of a flat plate of steel. The second ramp 16 also has a proximal end 31 and a distal end 34. The proximal end 31 of the second ramp 16 is also positioned near the support platform 28. Toward the distal ends 25 and 34 of the ramps 13 and 16, hinged portions 37 and 40 are formed by hingedly attaching a piece of the rigid material to the end of ramps 13 and 16. The hinged portions 37 and 40 allow the last portion of the ramps 13 and 16 to contact the horizontal support surface when the vehicle is rolling onto the apparatus 10. These hinged portions 37 and 40 facilitate the entry of the wheels of the vehicle onto the ramps 13 and 16 and provide an additional safeguard against movement of the apparatus 10 while the vehicle is being rolled onto the apparatus 10.

Figure 5:
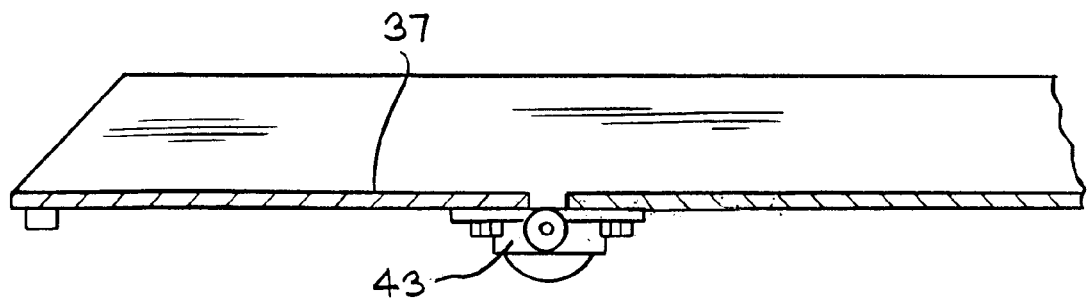
FIG. 5 is a sectional view taken along line 5—5 of FIG. 1.

The distal ends 25 and 34 of the ramps 13 and 16 also have a set of casters 43 and 46. The socket 101 for the wheels and casters 43 and 46 is best shown in FIG. 5. The casters 43 and 46 enable the ramps 13 and 16 to move smoothly across the horizontal support surface when the entire support apparatus 10 is being swivelled or rolled along the support surface. Lateral support members 49 extend from the bottom of the ramps 13 and 16. The lateral support members 49 are preferably retractable underneath the ramps 13 and 16 by means of a set of rails (not shown) and a mounting arrangement similar to a sliding drawer. The construction of these support members 49 is known to those skilled in the art and will not be described in detail herein. Lateral support members 49 are typically used to support the kickstand on a motorcycle. It is desirable for them to be retractable so that they can be moved out of the way when not in use to provide clearance around the apparatus 10.

The turntable 52 which is best shown in FIGS. 2 and 3 is shown in broken lines in FIG. 1 where it is positioned below the support platform 28. On opposite sides of support plate 28 there are foot pedals 55 which operate a linkage which will be described below. At one side on the bottom there is a lever 58 which controls locking mechanism 61 (best shown in FIG. 4).

At the proximal ends 22 and 31 of the first and second ramps 13 and 16, the ramps 13 and 16 attach to the support plate 28 by means of a set of hinges 64. These hinges 64 enable the ramps 13 and 16 to be folded up vertically to greatly reduce the footprint for storage purposes.

Turning to FIG. 2 the lateral support members 49 are shown mounted to the underside of ramps 13 and 16. The foot pedal 55 is pivotally attached to a support member 67 that is fixedly connected to the turntable 52 and that is operatively associated with the support platform 28 as described below. Support member 67 is preferably constructed out of a flat plate made of steel. A set of casters 70 (shown in FIG. 3) are attached to the bottom of support platform 28. Casters 70 are preferable, however, as will be evident to those of ordinary skill in the art, other rolling devices such as wheels, bearings and the like may also be used. By operation of the foot pedal 55, the support member 67 can be collapsed down to move the casters 70 from a position above the turntable 52 to a position below the turntable 52 and engaging with the support surface.

Turning to FIG. 3, the support platform 28 is connected to the turntable 52 by a set of hinges 73. Rotation of the support platform 28 about the pivot point established by the hinges 73 enables the support platform 28 to collapse downward towards the turntable 52 to deploy the casters 70.

Hinges 64 enable the ramps 13 and 16 to be folded upward. The ability of the ramps 13 and 16 to fold up for storage greatly reduces the footprint of the support apparatus 10 for ease of storage.

Figure 4:
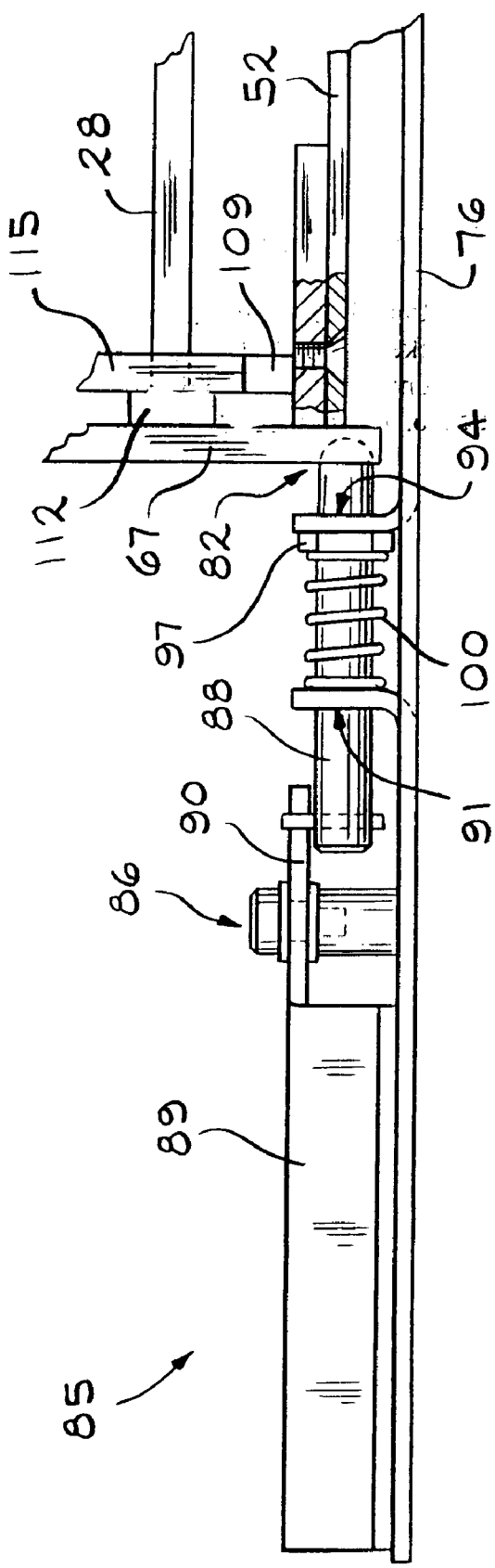
FIG. 4 is a sectional view taken along line 4—4 of FIG. 1.

Turning to FIG. 4, the turntable 52 rotates on a base plate 76. The support member 67 has an aperture 82 toward the bottom on the right hand side (best shown in FIG. 7). Attached to base 76 is an actuating mechanism 85 which is connected to a pin 88. The actuating mechanism 85 is preferably an L-shaped member attached to a pivot 86. Accordingly, applying a force to a first leg 89 causes a second leg 90 to retract pin 88. The pin 88 is guided through thoroughbores 91 and 94. The pin 88 has an enlarged portion 97 which is disposed between the thoroughbores 91 and 94. A spring 100 is disposed around the pin 88 and between the thoroughbores 91 and 94. The spring 100 biases the pin 88 forward such that the turntable 52 cannot rotate unless the actuating mechanism 85 is actuated to remove the pin 88 from the aperture 82. Once the pin 88 is released from the aperture 82 and the support member 67 and aperture 82 are rotated past the pin 88, the actuating mechanism 85 can be released and the spring 100 will cause the pin 88 to move forward. The pin 88 will remain in the forward biased position until the support member 67 on the opposite side rotates around to the pin 88 which occurs at 180° of rotation. The leading edge of the support member 67 is preferably chamfered adjacent to the aperture 82 such that when the member 67 rotates around and engages with the pin 88, the chamfered section 95 (shown in FIG. 7) engages with the pin 88 to push the pin 88 back far enough so that once it lines up with the aperture 82 it will shoot forward under the force of the spring 100 to once again lock the turntable 52 to prevent rotation.

In FIG. 5 the hinged portion 37 is connected to caster 43. Caster 43 enables the end of the ramp to move along the support surface when the turntable 52 is being rotated.

Figure 6:
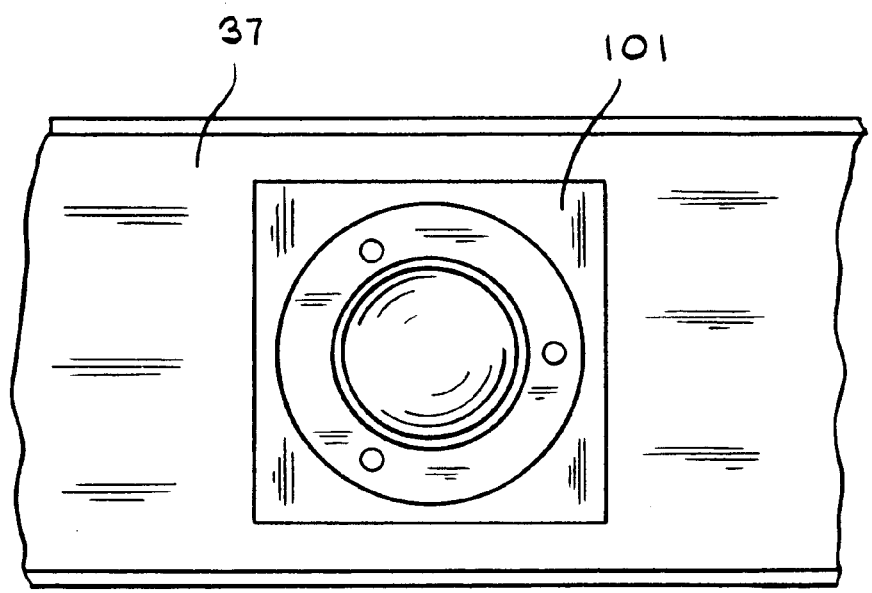
FIG. 6 is a partial bottom plan view of the end of the ramp of the present invention.

Turning to FIG. 6, the rolling device, caster, ball bearing, or ball and socket which provides rolling contact with the support surface during rotation of the turntable 52 is mounted to a socket 101 which is attached to the bottom of the ramps 13 and 16.

Figure 7:
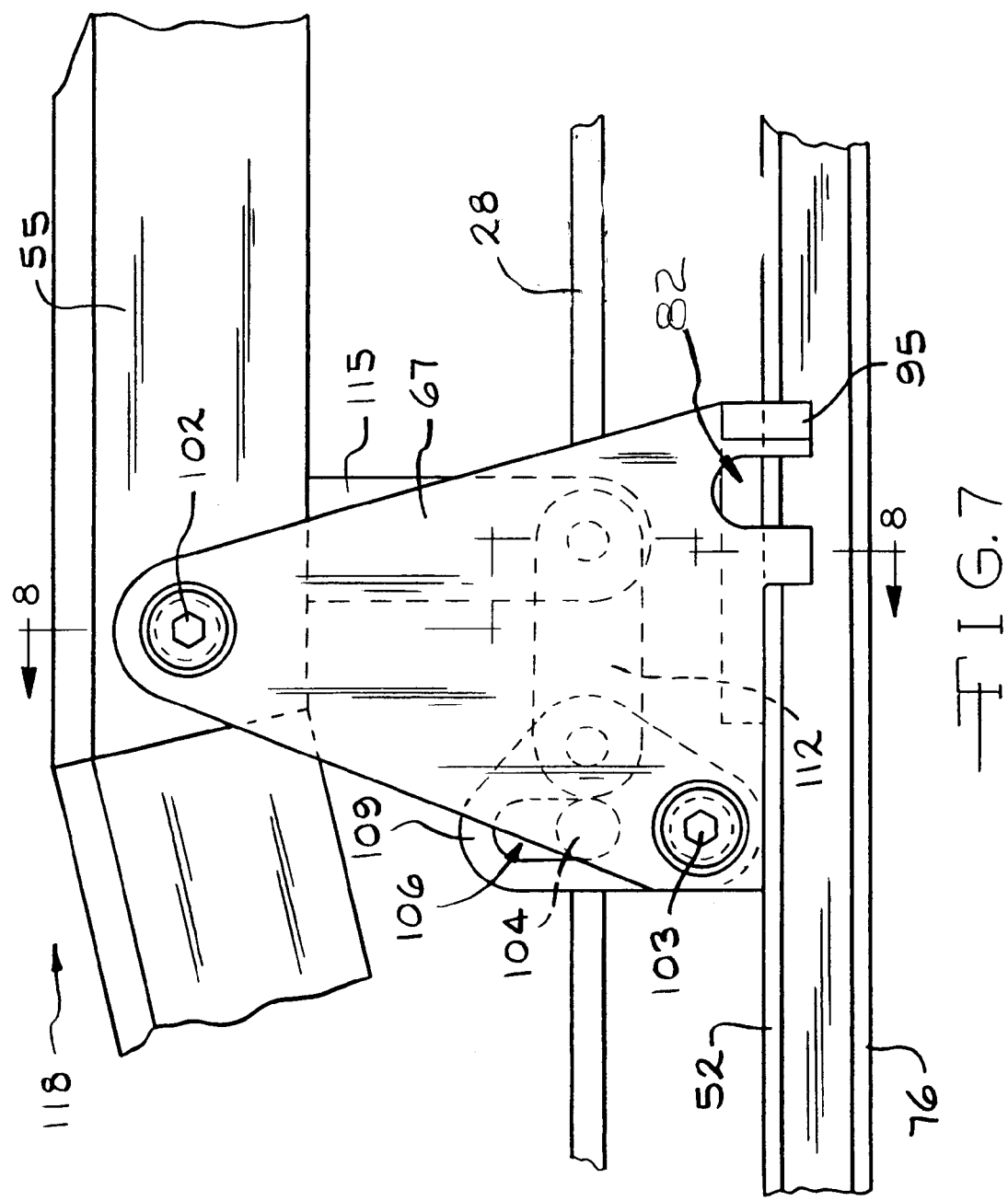
FIG. 7 is a sectional view taken along line 7—7 of FIG. 1.

In FIG. 7 the foot pedal 55 is pivotally attached to the support plate 67 which is fixedly attached to the turntable 52. Toward the top of the support member 67 a pin 102 pivotally attaches the foot pedal 55 to the support member 67. Toward the bottom corner of the support member 67 another pin 103 attaches a cam link 109 to the support member 67. The support platform 28 has a pin 104 attached thereto which engages with a slot 106 disposed in the cam link 109. The cam link 109 is pivotally attached to a bar 112. Bar 112 is pivotally attached at the opposite end to another bar 115. The bar 115 is fixedly attached to the foot pedal 55. Towards the bottom of the support member 67 there is a semicircular opening which defines aperture 82. As described above, aperture 82 provides a passageway for pin 88 which locks the turntable 52 to prevent it from rotating.

The foot pedal 55 is engaged by causing it to rotate clockwise about support member 67 as shown by arrow 118. When the foot pedal 55 rotates it rotates the bar 115 which is fixedly attached. The bar 115 in turn drives the cam link 109 through the intermediate bar 112. As described above, the cam link 109 is pivotally attached to the support member 67 at the bottom right hand corner and therefore the force of the intermediate bar 112 causes the cam link 109 to rotate counterclockwise about the pivot point. When the cam link 109 is driven by the linkage, the slot 106 exerts a force on the pin 104 attached to support platform 28. As a result both the pin 104 and the support platform 28 are forced downward by the slot 106. When the support platform 28 is collapsed downward, the casters 70 engage with the horizontal surface enabling movement of the support apparatus 10 along the horizontal surface. In this manner, the support apparatus 10 can no longer swivel but can roll along the floor to allow the user to move the support apparatus 10 to a new location.

Figure 8:
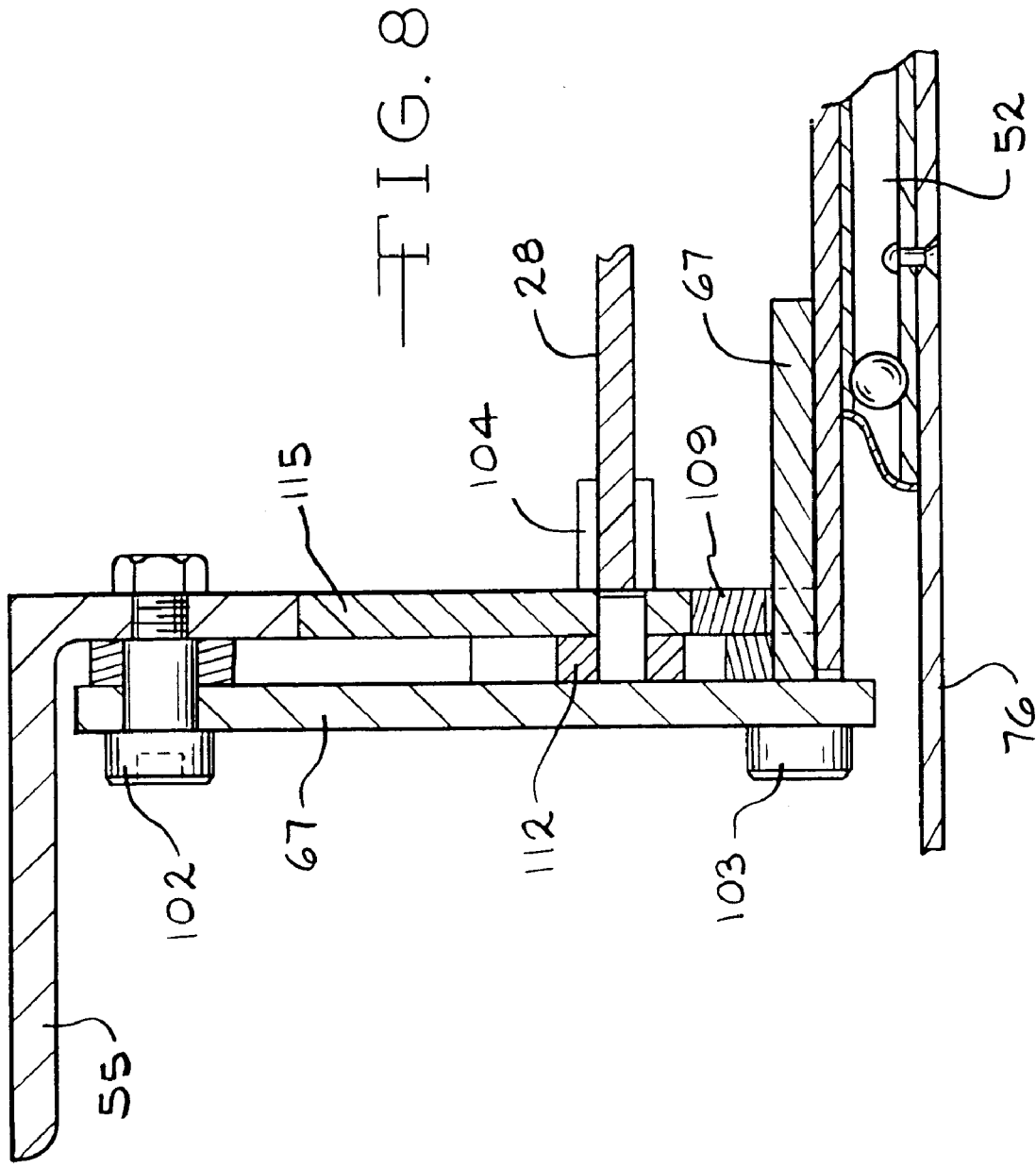
FIG. 8 is a sectional view taken along line 8—8 of FIG. 7.

In FIG. 8, a sectional side view of the linkage is shown. The foot pedal 55 is fixedly attached to bar 115. Bar 115 is pivotally attached to bar 112. Cam link 109 is behind bar 115 in this view and therefore only a portion of the link 109 can be seen. Also, pin 104 which attaches to support platform 28 is shown partially and the point where the pin 104 enters slot 106 in cam link 109 is obstructed by bar 115 in this view.

Support member 67 is fixedly attached to the turntable 52 by an angled portion. The angled portion is preferably attached to the turntable 52 by a screw as shown in FIG. 4. However, other means for fastening support member 67 to turntable 52 will be evident to those skilled in the art.

In operation, the support apparatus 10 is initially placed in the casters 70 retracted position with the pin 88 engaged in the aperture 82. At this point the support apparatus 10 cannot move in any direction on the casters 70 and cannot rotate by means of the turntable 52. With the support apparatus 10 in this state, the vehicle is rolled onto the apparatus. The hinged end sections of ramps 13 and 16 provide further safety and stability as they engage with the horizontal surface as the wheels of the vehicle are rolled across the top of them.

Once the vehicle is rolled onto the support apparatus 10, the operator can lower the kickstand onto the lateral support member 49 and the vehicle is securely parked. In order to spin the apparatus 10 to turn the vehicle around, the operator mounts the vehicle and engages the actuating mechanism 85 to release the pin 88 from aperture 82. At this point the vehicle is free to rotate 180° until the apparatus 10 automatically locks through engagement of pin 88 with the aperture 82 on the opposite side.

If the operator wants to move the vehicle rather than simply turning it around, the foot pedal 55 is actuated (with the turntable 52 locked down by engagement of pin 88) to collapse support plate 28 downward to bring the casters 70 into contact with the horizontal surface. Once the casters 70 are in contact with the horizontal surface, the vehicle can be rolled about the surface freely.

Figure 9:
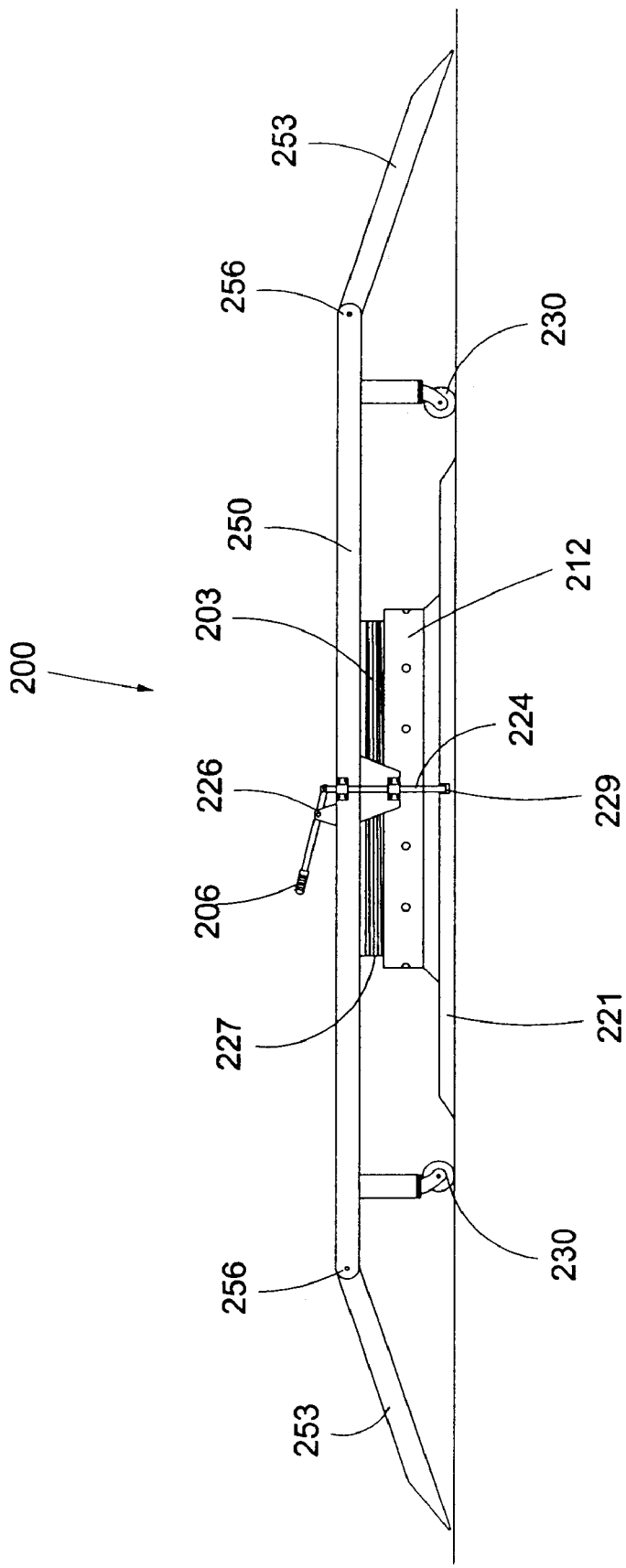
FIG. 9 is a side elevation view of an alternate embodiment of the invention.
Figure 10:
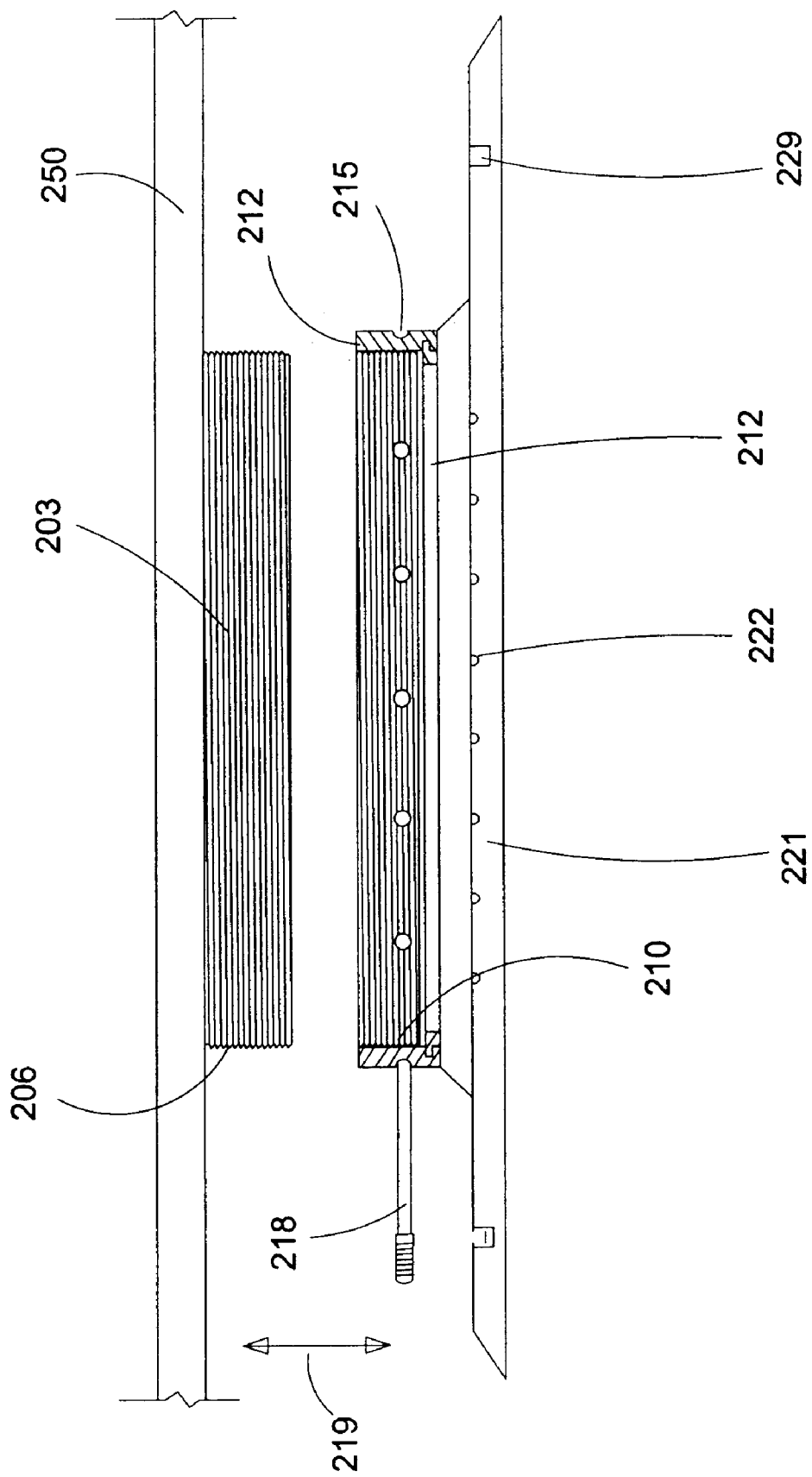
FIG. 10 is a sectional side elevational view of the alternate embodiment with the bearing plate completely removed from the platform.

Turning to FIGS. 9–10, an alternate embodiment of the present invention provides a platform 200. The platform 200 is an elongate rigid structural member constructed of a suitable material and wide enough to accommodate a large motorcycle or a snowmobile.

The platform 200 is provided with a hollow stub 203 (best shown in FIG. 10) having a set of external threads 206. The stub 203 is disposed on the underside of the platform 200. A jack screw 209 has an opening that is tapped with a set of internal threads 210 such that it is capable of threadingly engaging with the stub 203. The jack screw 209 includes a collar 212 having a set of apertures 215 disposed therein. The apertures 215 provide a leverage point for a rod member 218 suitable for rotating the jack screw 209 relative to the stub 203. The rod member 218 is an elongate bar or rod capable of providing leverage through engagement with the apertures 215 on the collar 212. By rotating or counter rotating the jack screw 209 relative to the stub 203, the jack screw 209 is raised or lowered in the direction of arrows 219 relative to the platform 200. At the opposite end of the jack screw 209 a bearing plate 221 is attached to the jack screw 209. The jack screw 209 rotates freely relative to the bearing plate 221. Accordingly, when the jack screw 209 is attached to the stub 203 and the bearing plate 221 is in contact with the support surface, the platform 200 may be rotated freely about the bearing plate 221 on set of bearings 222.

A brake rod 224 (FIG. 9) is pivotally attached to a foot pedal 227. The brake rod 224 is disposed substantially perpendicular to the bearing plate 221 and has an end portion that is capable of entering an opening 225 in the bearing plate 221. When the brake rod 224 is engaged with the opening 225 in the bearing plate 221, the platform 200 is prevented from rotating relative to the bearing plate 221. The foot pedal 227 is disposed across a fulcrum 226 such that depressing the pedal 227 raises the brake rod 224 out of the opening 225 in the bearing plate 221. A spring (not shown) can be used to bias the brake rod 224 downward into the opening. With the brake rod 224 removed from the opening 225 the foot pedal 227 can be released and the platform 200 can spin relative to the bearing plate 221. The brake rod 224 is biased downward but it slides across the surface of the plate 221 until it reaches another opening 229 where the force of the spring causes the brake rod 224 to pop down into the opening to prevent further rotation of the platform 200. Accordingly, the openings 225, 229 may be disposed on opposite sides of the bearing plate 221 such that the brake rod 224 can be released and the platform 200 can be rotated one-hundred eighty degrees before the brake rod 224 enters the next opening in the bearing plate 221.

In order to switch between the rotation mode where the bearing plate 221 contacts the support surface and the rolling mode where a set of casters 230 contact the support surface, the jack screw 209 is rotated with the brake rod 124 engaged with the bearing plate 221 such that the jack screw 209 either raises or lowers relative to the stub 203. If the jack screw 209 is turned such that it raises toward the underside of the platform 200 it is capable of rotating until it lifts the bearing plate 221 off of the support surface thereby enabling the casters 230 to bear the weight of the platform 200. When the jack screw 209 is turned the opposite way, the bearing plate 221 is lowered into engagement with the support surface to place the platform 200 into the rotational mode.

The platform 200 is preferably divided into a central portion 250 and opposite end portions 253. The end portions 253 are pivotally connected to the central portion 250 and biased by a spring hinge 256 such that the end portions 253 are normally disposed above the support surface. The end portions 253 are capable of rotating downward into contact with the support surface when the force against the end portion 253 overcomes the force of the spring 256. The spring 256 is typically overcome by the wheel or belt of the vehicle as it is pushed onto the platform 200.

Figure 11:
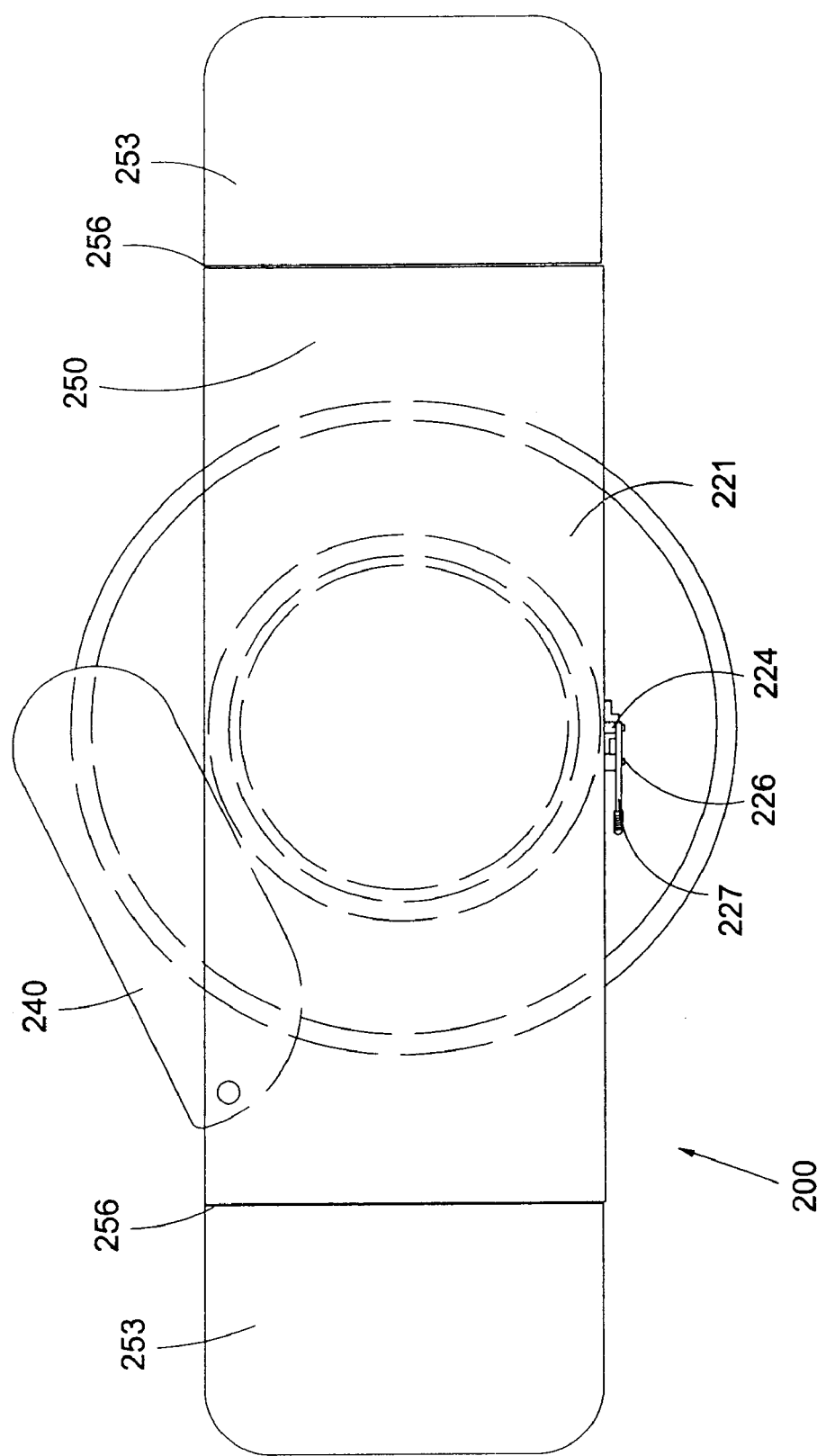
FIG. 11 is a plan view of the alternate embodiment.
Figure 12:
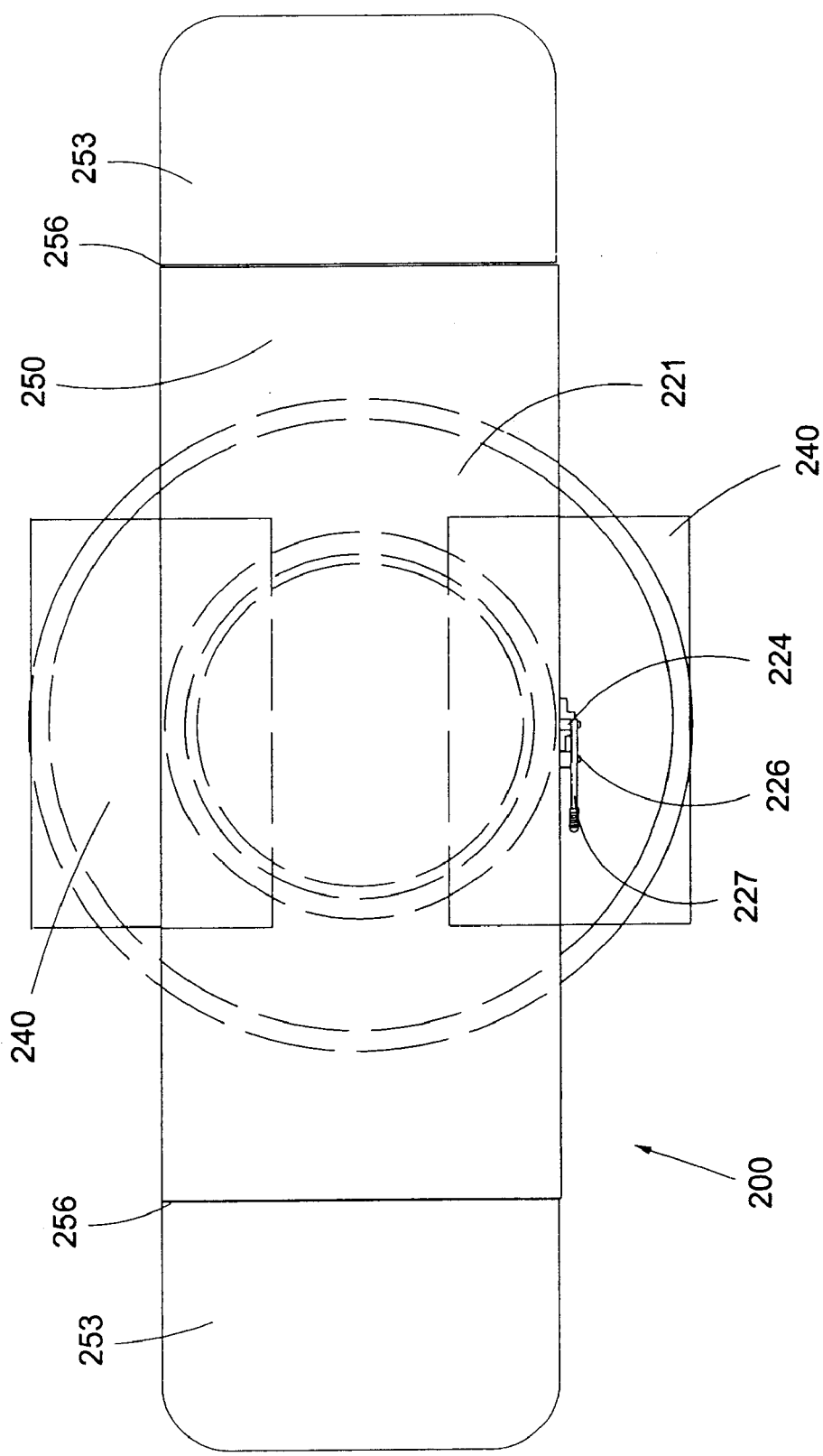
FIG. 12 is a plan view showing an alternate auxiliary support member.

Turning to FIGS. 11 and 12, the present invention may be designed with a platform 200 in several different widths. The platform 200 may even be designed to be wide enough to accommodate the belt and the runners of a snowmobile. However, if the platform is designed only wide enough to accommodate the wheels of a motorcycle or the belt of a snowmobile, a pair of retractable auxiliary support members 240 may be pivotally attached to the underside of the platform to provide support for the kickstand or the runners on a snowmobile.

While the invention has been described in connection with certain preferred embodiments, it is not intended to limit the scope of the invention to the particular form set forth, but, on the contrary, is intended to cover such alternatives, modifications, and equivalents as may be included within the spirit and scope of the invention as defined by the appended claims.

What is claimed is:

1. A support apparatus for use with a horizontal support surface, the support apparatus comprising:
   a platform having a first surface and a second surface disposed opposite the first surface, the second surface having a threaded member disposed thereon;
   a jack screw having a set of threads capable of engaging with the threaded member such that rotation of the jack screw causes the jack screw to move toward and away from the platform;
   a bearing plate connected to the jack screw and capable of rotating relative to the jack screw on a set of bearings; and,
   a set of rolling devices attached to the bottom of the platform;
   wherein the jack screw is capable of lowering the bearing plate into engagement with the support surface such that the platform rotates relative to the support surface and the jack screw is capable of raising the bearing plate off of the support surface such that the rolling devices engage with the support surface for translatory movement of the platform.

2. The support apparatus of claim 1, further comprising:
   a first opening defined in the bearing plate;
   a brake rod pivotally attached to the platform and capable of pivoting in and out of engagement with the opening such that engagement of the brake rod in the opening prevents rotation of the platform relative to the support surface.

3. The support apparatus of claim 2, wherein the brake rod is attached to a foot pedal.

4. The support apparatus of claim 3, further comprising a second opening in the bearing plate disposed approximately one-hundred and eighty degrees from the first opening.

5. The support apparatus of claim 1, further comprising a collar disposed on the jack screw and having a plurality of apertures defined therein.

* * * * *